United States Patent
Ballantyne

[15] 3,660,842
[45] May 2, 1972

[54] AZIMUTH INTERPOLATOR
[72] Inventor: Jack R. Ballantyne, Santa Ana, Calif.
[73] Assignee: Hughes Aircraft Company, Culver City, Calif.
[22] Filed: May 25, 1970
[21] Appl. No.: 40,014

[52] U.S. Cl. ...........................393/16 R, 328/48, 328/120, 343/5 DP
[51] Int. Cl. ...........................................G01s 9/52
[58] Field of Search...............343/5 DP, 16; 328/48, 49, 120

[56] References Cited

UNITED STATES PATENTS 2,851,635   9/1958   West.....................328/49 X
3,235,867   2/1966   Wirth...............343/5 DP X Primary Examiner—Malcolm F. Hubler
Attorney—James K. Haskell and Walter J. Adam

[57] ABSTRACT

An azimuth interpolator is disclosed which receives as an input a sequence of a fixed number of azimuth change pulses for each revolution of a rotating antenna. The time periods between adjacent pairs of the input pulses are assumed to be nearly, but not necessarily, equal. The interpolator includes a first counter which measures the time period between each pair of pulses by accumulating a count which is related to the measured period. At the end of the measured period, the count is transferred to a register which holds the count while the first counter measures a succeeding period. During the latter period, a second counter is clocked at a rate which is greater than the clocking rate of the first counter by a factor $X$. Each time the count in the second counter equals the count in the register, a pulse is produced which is inserted between the two input pulses which define the period being measured. The interpolator includes an inhibit structure which prevents the $X^{th}$ pulse from being inserted either immediately before or after the input pulse which defines the end of the period which is being measured.

10 Claims, 4 Drawing Figures

PATENTED MAY 2 1972

INVENTOR.
JACK R. BALLANTYNE,
BY
Walter J. Adam
ATTORNEY.

AZIMUTH INTERPOLATOR

The invention herein described was made in the course of or under a contract or subcontract thereunder with the Air Force.

BACKGROUND OF THE INVENTION

1. Field of the Invention

The present invention generally relates to radar circuitry and, more particularly, to an azimuth interpolator for enhancing azimuth output signals in radars of the type which provide a fixed number of azimuth change pulses per antenna revolution.

2. Description of the Prior Art:

In certain types of radar, such as a fan-beam surveillance radar, a fixed number of azimuth change pulses, hereafter designated as $\Delta\theta$, are provided per one full antenna rotation. Clearly, the effective azimuth accuracy of such a radar is limited by the number of $\Delta\theta$ pulses. The effective azimuth accuracy could be greatly increased if the actual number of $\Delta\theta$ pulses which are provided per antenna revoluation or scan period could be increased.

Assuming the number of pulses per revolution or scan period to be 1,024, each pulse represents an azimuth change of 360/1,024 degrees. Generally the $\Delta\theta$ pulses following a north-indicating pulse are accumulated in a counter whose output represents azimuth position. Due to the large mass of the radar antenna, it does not change rotation rate rapidly. Consequently, the change in period between adjacent $\Delta\theta$ pulses is very small. However, over a full antenna revolution, due to imperfect mechanical couplings, some change in period is noticable.

It is appreciated that effective azimuth accuracy can be greatly increased by increasing the number of $\Delta\theta$ pulses per antenna revolution. Since in the prior art the number of pulses is fixed, it is desirable to provide an arrangement to selectively increase the number of pulses by a selected factor to increase azimuth accuracy. Such an arrangement can be thought of as an azimuth interpolator.

OBJECTS AND SUMMARY OF THE INVENTION

It is a primary object of the present invention to provide a novel azimuth interpolator for use in a radar system.

Another object of the present invention is to provide a novel arrangement for increasing the number of azimuth change pulses, in response to a fixed number of pulses received from a rotating antenna, in order to increase azimuth resolution.

A further object of the invention is to provide a highly reliable arrangement with which the number of azimuth change pulses which are produced in response to a fixed number of azimuth change pulses provided by a rotating antenna is increasable by a selected factor for increased azimuth resolution.

These and other objects of the invention are achieved by measuring the time period between each pair of adjacent $\Delta\theta$ pulses, provided from the rotating antenna. Then, while a succeeding time period is measured, the previously measured period is divided by a selected factor and based on this factor a selected number of pulses are inserted between the following two adjacent $\Delta\theta$ pulses. For example, when the period is divided by a factor of 2, 4 or 8, and one, three or seven pulses, respectively, are inserted between the following two adjacent pulses.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
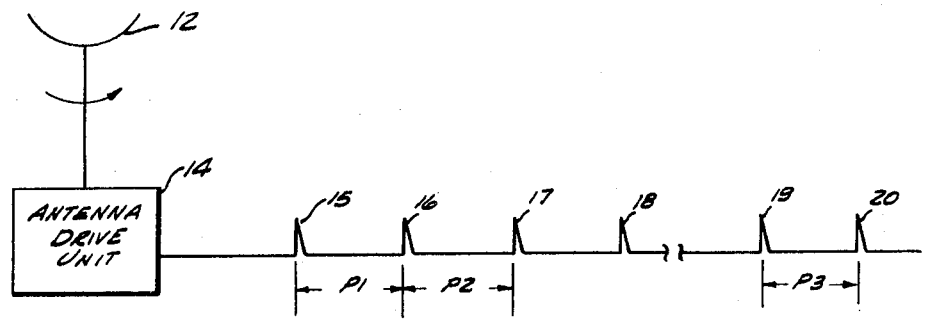
FIG. 1 is a simple diagram useful in explaining the type of input pulses provided in the present invention.

The function of the novel azimuth interpolator of the preset invention may best be explained by first referring to FIG. 1 wherein numeral 12 designates a rotating antenna driven by an antenna drive unit 14. As is appreciated by those familiar with the art, such an assembly provides a sequence of azimuth change or $\Delta\theta$ pulses, designated in FIG. 1 by numerals 15–20. The number of pulses per antenna revolution is fixed and for explanatory purposes is assumed to be 1,024.

Clearly, with a fixed number of pulses, the time period between adjacent $\Delta\theta$ pulses is a function of the time required for one complete antenna revolution, sometimes referred to as the scan period. If the time period between adjacent $\Delta\theta$ pulses were constant, a relatively simple arrangement could be used to insert a selected number of pulses between adjacent $\Delta\theta$ pulses. However, this in not the case. Due to mechanical coupling inaccuracies, the time period is not a constant. Designating two non-contiguous time periods as P1 and P3, the two are often unequal. Contiguous time periods, such as P1 and P2 can be regarded to be equal, since the radar antenna is a large mass and therefore its rotation rate cannot change rapidly. However, some small difference may exist between contiguous time periods.

Figure 2:
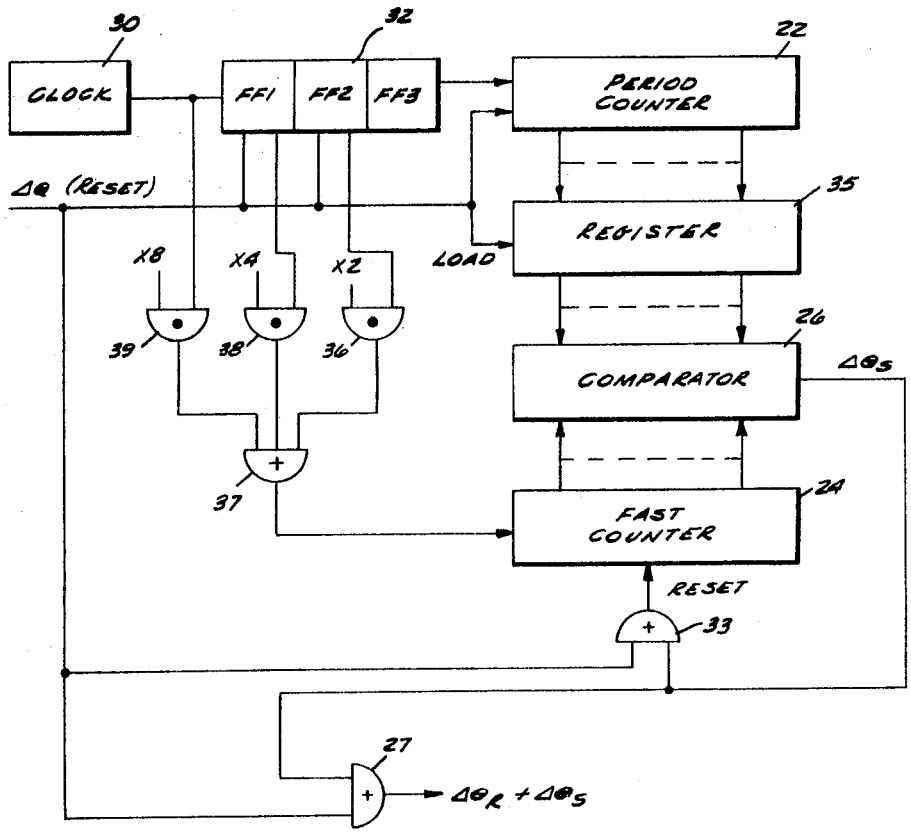
FIG. 2 is a basic block diagram of the invention.

Briefly, in accordance with the teachings of the present invention, the time period, such as $P_1$ between adjacent $\Delta\theta$ pulses 15 and 16, is measured. Then while period $P_2$ is measured, previously measured time period $P_1$ is divided by a selected factor, such as 2, 4 or 8 and one, three, or seven pulses respectively are inserted between the following two adjacent $\Delta\theta$ pulses 16 and 17. These functions are performed by the novel interpolator which is shown in simplified block form in FIG. 2.

Briefly, time period measurement is performed by counter 22, time period division by counter 24, the generation of additional azimuth change pulses by comparator 26 and pulse insertion by an OR gate 27. Basically, counter 22 is clocked by clock pulses which are supplied thereto from a clock 30 through a clock pulse divider 32, shown comprising three flip-flops FF1–FF3. Thus, the clocking rate of the counter 22 is one-eighth the pulse rate from clock 30.

In practice, the number of stages or bits of counter 22 depends on the rate at which it is clocked and the maximum spacing or time period P, between adjacent $\Delta\theta$ pulses. Assuming a scan period of 16 seconds and 1,024 $\Delta\theta$ pulses per antenna revolution, the average period is 16/1,024=15.6ms. Assuming that the maximum period is 16.384ms and that the counter 22 is clocked by clock pulses of a clock period of 64$\mu$s, it is apparent that during the maximum period, 256 or $2^8$ counts can be accumulated in counter 22 without exceeding its maximum count. Thus, it can be stated that the counter 22 is chosen to be of a length so that for a given clock rate a maximum count can be accumulated therein during the period which is measured without exceeding the counter's maximum count.

It is apparent that if the counter 22 is assumed to be clocked at a rate of once per 64$\mu$s, the clock period from the clock 30 is 64/8=8$\mu^{16}\mu$s, and 32$\mu$s, respectively.

As shown, when a $\Delta\theta$ pulse is received from the antenna it resets the counter 22 and the FF's of the clock dividing network 32. It also provides a load signal to a register 35 which is loaded with the accumulated count in the counter 22 before the latter is reset. To inhibit the counter 22 from being reset before the register is loaded with its count, the resetting signal to the counter may be delayed by a clock period in manners well known in the art. Each $\Delta\theta$ pulse from the antenna further resets counter 24 through an OR gate 33, and is supplied as a real $\Delta\theta$ pulse, hereafter designated as $\Delta\theta_R$ to output Or gate 27.

The content of register 35 is supplied to comparator 26, which compares the register's content or count with the count in the counter 24. The latter is clocked at a rate which is greater than the clocking rate of counter 22 by a selected factor such as 2, 4, etc., depending on the number of pulses which are to be inserted between adjacent $\Delta\theta$ pulses from the antenna. For example, to insert a single pulse between adjacent $\Delta\theta$ pulses, i.e., to increase the number of azimuth change pulses by a factor of 2 represented by 2X, an AND gate 36 is enabled. The gate is supplied with the output of FF2 which is at twice the clocking rate of counter 22. Gate 36 enables OR gate 37 whose output has a clocking period which is half the clocking period of counter 22. Thus, counter 24 is clocked at twice the clocking rate of counter 22.

When the accumulated count in counter 24 equals the count in register 35, comparator 26 provides an output pulse. This pulse can be thought of as a synthetic $\Delta\theta$ pulse, and is designated $\Delta\theta_S$. It resets counter 24 through gate 33 and is also supplied to output gate 27. The output of the latter is the composite of the real $\Delta\theta$ pulses from the antenna, designated $\Delta\theta_R$ and the synthetic pulses $\Delta\theta_S$ from the comparator.

The insertion of three pulses $\Delta\theta_S$ between a pair of real $\Delta\theta$ pulses is accomplished by activating AND gate 38 which is supplied with clocking pulses from FF1 at four times the clocking rate of counter 22. This is done by setting the terminal designated X4 to a true level. Consequently, counter 24 is clocked at four times the clocking rate of counter 22. The insertion of seven synthetic pulses between a pair of real $\Delta\theta$ pulses is achieved by enabling gate 39 with the clock pulses from clock 30 which are provided at eight times the clocking rate of counter 22 so counter 24 is clocked at eight times the clocking rate of counter 22. This is achieved by setting the terminal X8 of gate 39 to a true level.

Figure 3:
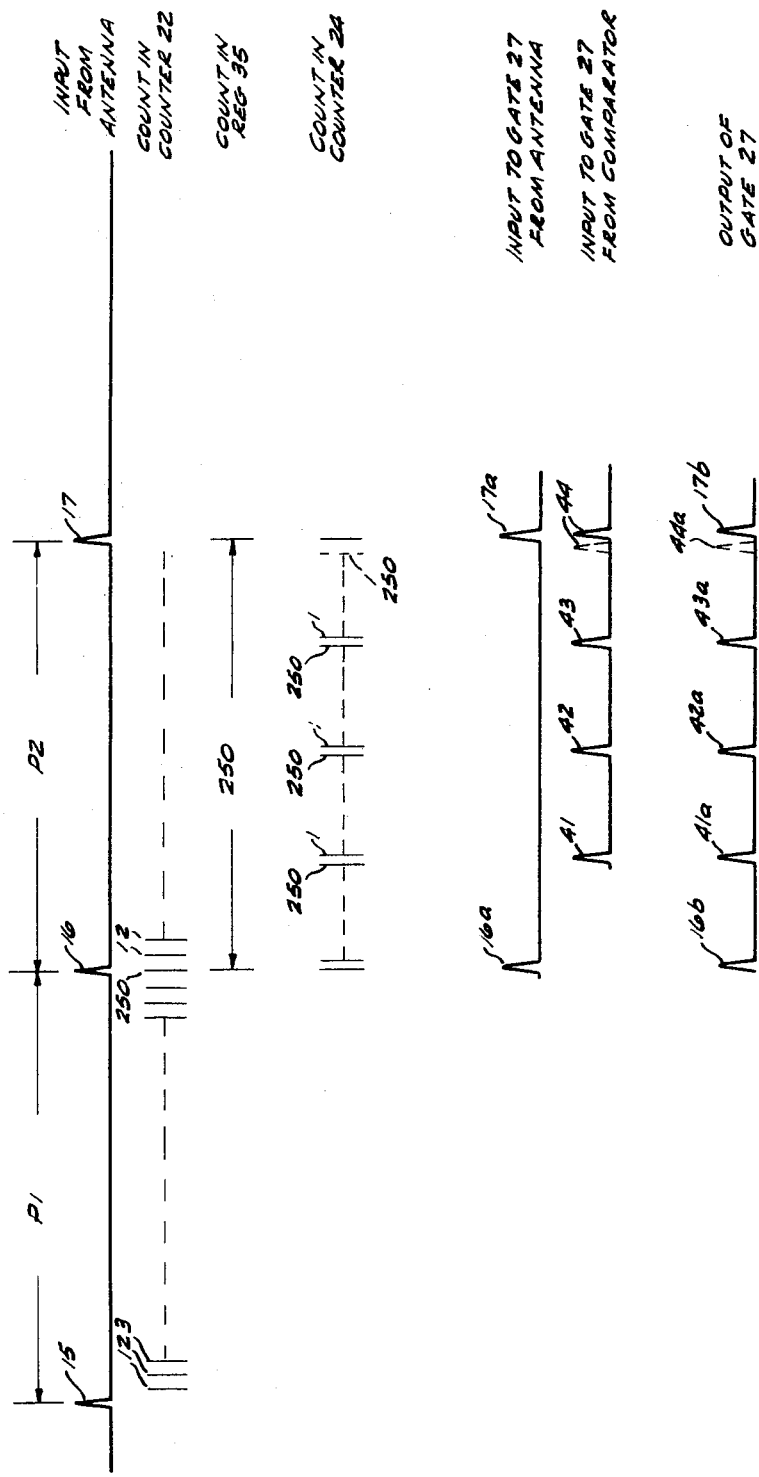
FIG. 3 is a multiline waveform diagram useful in explaining the operation of the invention shown in FIG. 2.

The foregoing description of the operation of the interpolator may best be summarized in connection with a specific example which will be described in conjunction with FIG. 3. For this example, it is assumed that the maximum spacing between real $\Delta\theta$ pulses is 16.384ms, counter 22 is eight bits long and its clock period is 64$\mu$s. Let it be assumed that the period P1 between pulses 15 and 16 is such that when pulse 16 arrives at $t_1$ the count in counter 22 is 250. This count is transferred to register 35 at $t_1$ and then counter 22 is reset to accumulate a count which represents the period P2 between pulse 16 and the succeeding pulse 17. Also gate 27 is enabled at $t_1$ to provide an output pulse corresponding to $\Delta\theta$ pulse 16. The pulse which is supplied to gate 27 is designated by 16a and the corresponding output pulse real $\Delta\theta$ pulse is designated 16b.

Let it be assumed that it is desired to insert three pulses between pulse 16 and its succeeding pulse 17. Under these conditions gate 38 is enabled to clock counter 24 at four times the clocking rate of counter 22. While counter 22 accumulates the count which is to represent a measure of period P2, the count in register 35 is 250 which represents the previously measured period P1. Each time the count in counter 24 reaches 250, comparator 26 provides a synthetic pulse $\Delta\theta_S$, which is supplied to gate 27. The three pulses which are supplied to gate 27 between pulses 16 and 17 are designated by numerals 41, 42 and 43 and the corresponding output pulses of gate 27 are designated by numerals 41a, 42a and 43a, respectively.

Clearly, if period P2 were exactly equal to period P1 which is represented by the number 250 in register 35, pulse 17 will be received by the interpolator and be supplied to gate 27 as pulse 17a at the same instant that a fourth pulse 44 will be supplied thereto from comparator 26. The two coincident in-time pulses will result in a single gate 27 output, designated as pulse 17b. If, however, a slight difference between the two adjacent time periods P1 and P2 is present, the two pulses 17a and 44 will not be coincident in time and consequently will result in two adjacent output pulses of gate 27. For example, if P2>P1 pulse 44 will occur prior to pulse 17a as represented in FIG. 3 by pulse 44 in dashed lines. Consequently, output pulse 17b will be preceded by an adjacent pulse 44a. On the other hand, if P2<P1 pulse 44 would occur after pulse 17a and therefore pulse 44a would follow pulse 17b.

Figure 4:
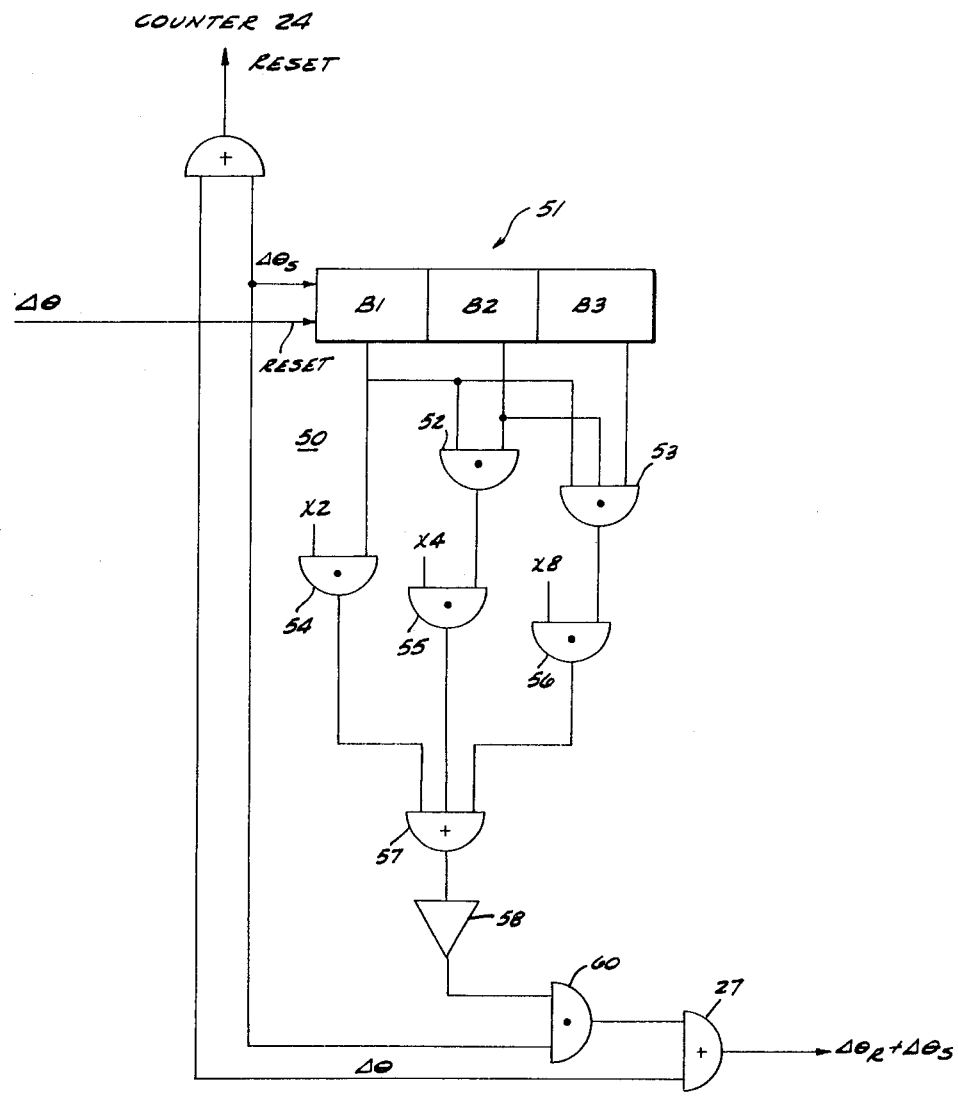
FIG. 4 is a block diagram of a pulse inhibiting structure, which forms part of the invention.

Such an operation will result in an unequal spacing between the output pulses of gate 27. To prevent this condition from occurring, the interpolator includes a gating structure shown in FIG. 4 which is designed to inhibit a synthesized pulse $\Delta\theta_S$ from activating gate 27 either immediately before or after a real pulse $\Delta\theta$ from the antenna, due to slight differences between the lengths of adjacent time periods. Basically, the gating structure 50 includes a multibit counter 51. For the arrangement in which either one, three or seven synthetic pulses $\Delta\theta_S$ are to be inserted between a pair of adjacent $\Delta\theta$ pulses. The counter includes three stages or bits B1–B3. The counter is clocked by each synthetic pulse $\Delta\theta_S$ from the comparator 26 and is reset by each $\Delta\theta$ pulse from the antenna. For the particular example, 5 AND gates 52–56 and OR gate 57 and an inverter 58 are associated with the counter. The inverter output is true depending on the count in counter 51 and the clocking rate of counter 24 which controls the number of synthetic pulses to be inserted. The output of the inverter 58 and the output of comparator 26 are supplied to AND gate 60 whose output is ORed with the real $\Delta\theta$ pulses in OR gate 27.

Briefly, when the counter 24 is clocked at four times (X4) the clocking rate of counter 22, the outputs of gates 54 and 56 are always false. Consequently, gate 57 can only be turned on by gate 55. When the count in the counter 51 is less than three, gate 52 is turned off and so is gate 55. Consequently, the output of gate 57 is false and the output of inverter 58 is true. This enables each of the three pulses $\Delta\theta_S$ from the comparator, such as pulses 41–43 to enable gate 60 which in turn enables output gate 27 to provide pulses 41a, 42a and 43a, respectively. However, after three pulses are provided by the comparator, gate 52 is turned on turning on gates 55 and 57. Consequently, the inverter output is false, thereby inhibiting a fourth pulse, such as pulse 44 which proceeds the next $\Delta\theta$ pulse from activating gates 60 and 27.

It should be apparent that when the X2 clocking rate is employed, after a single pulse $\Delta\theta_S$ is inserted, gate 54 is turned on, in turn activating gate 57. Consequently, the inverter's false output inhibits a succeeding pulse $\Delta\theta_S$ from activating gates 60 and 27. Similarly, when the X8 clocking rate is employed, the first seven pulses $\Delta\theta_S$ pass through gates 60 and 27. The seventh pulse sets counter 51 to an all one state thereby enabling gate 53, which in turn enables gates 56 and 57. Consequently, the inverter's false output inhibits the eight pulse $\Delta\theta$ from activating gate 60 and more particularly, output gate 27.

From the foregoing it is thus seen that in accordance with the present invention, one or more synthetic azimuth change pulses $\Delta\theta_S$ can be inserted between each pair of real azimuth change pluses $\Delta\theta$ from the rotating antenna. The number of inserted synthetic pulses can be defined as $X-1$, where $X$ represents the number into which a previously measured time period, such as P1 between two successive azimuth change pulse $\Delta\theta$, such as 15 and 16 is divided, while a succeeding time period such as P2 between another pair of pulses, such as 16 and 17, is measured. The time period division is achieved by clocking a counter, such as counter 24, as $X$ times the rate at which a clock such as clock 22 which is used to measure the time period to be divided is clocked. The factor $X$ may be equal to $2^n$ where $n$ is an integer. Consequently, $2^n-1$ synthetic pulses are inserted between each pair of real $\Delta\theta$ pulses. For example, when $n$ is either 1, 2 or 3, i.e., the time period is divided by $2^1=2$, $2^2=4$ or $2^3=8$, the number of inserted pulses is $2-1=1$, $2^2-1=3$ or $2^3-1=7$.

It should be appreciated that although the invention has been described in connection with simple AND and OR gates other types of gates such as NAND and NOR gates may be employed to perform the desired logic functions. It should further be appreciated that the invention may be employed to insert equally spaced pulses between each pair of input pulses in a sequence of input pulses, where the periods between adjacent pairs of input pulses are nearly, but not necessarily, equal.

It should be stressed that for the present invention, it is assumed that two adjacent periods such as P1 and P2 are nearly but not necessarily equal. If adjacent periods are equal, i.e., if the period between any two adjacent input pulses is the same, the need for the invention is greatly reduced. On the Other hand, if the difference between adjacent periods is great, the inserted pulses cannot be uniformly spaced between the two pulses. The tolerable difference clearly depends on the desired accuracy of the spacing of the inserted pulses.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. In a radar system of the type including a rotatable antenna and means which provide a sequence of antenna azimuth change indicating pulses, said sequence including a fixed number of azimuth change indicating pulses for each antenna revolution, an arrangement comprising:
   first means responsive to said pulse sequence for measuring the time between a pair of successive pulses in said sequence;
   second means for containing said measured time period while said first means measure a succeeding time period between a succeeding pair of pulses;
   third means for dividing the measured time period contained in said second means into $X$ equal time periods, while said first means measure said succeeding time period, and for providing a pulse at the end of each of said $X$ time periods; and
   fourth means for combining said azimuth change indicating pulses with the pulses from said third means to provide a sequence of pulses comprising said azimuth change indicating pulses with $X-1$ pulses between each pair of azimuth change indicating pulses.

2. The arrangement as recited in claim 1 wherein $X=2^n$ where $n$ is an integer.

3. The arrangement as recited in claim 1 wherein successive time periods between successive pairs of azimuth change indicating pulses in said sequence are unequal, and said fourth means include means for inhibiting the $(X-1)^{th}$ pulse provided by said third means when said measured time period is divided into $X$ equal time periods from being included in the sequence provided by said fourth means.

4. The arrangement as recited in claim 1 wherein said first means comprises a first counter, and said arrangement includes means for clocking said counter at a first clocking rate to accumulate a count therein during the time period to be measured, with the count being directly related to said measured time period, said second means comprising a register for receiving at the end of the measured time period the count accumulated in said first counter, and for containing said count during a subsequent time period, measured by said first counter, said third means comprising a second counter clockable at a second clockable rate which is greater than said first rate by a factor $X$, and comparing means for comparing the count in said register with the count in said second counter and for providing an output pulse whenever the two counts are equal, and means for resetting said second counter with the output pulse of said comparator.

5. The arrangement as recited in claim 4 wherein $X=2^n$ wherein $n$ is an integer.

6. The arrangement as recited in claim 5 wherein successive time periods between successive pairs of azimuth change indicating pulses in said sequence are unequal, and said fourth means include means for inhibiting the $(X-1)^{th}$ pulse, provided by said third means when said measured time period is divided into $X$ equal time periods, from being included in the pulse sequence provided by said fourth means.

7. An arrangement responsive to a sequence of separate input pulses including first, second and third pulses for providing an output sequence of output pulses, said output sequence containing an output pulse corresponding to each input pulse and additional pulses inserted between each pair of output pulses which correspond to a pair of input pulses, the arrangement comprising:
   a first counter clockable at a first rate for accumulating a count which corresponds to the time period between each pair of input pulses;
   a register responsive to said second input pulse for receiving the count accumulated in said first counter during the time period between said first and second input pulses and for holding said count therein during the period between said second and third input pulses;
   a second counter clockable during the time period between said second and third input pulses at a second rate which is greater than said first rate by a factor $X$, $X$ being an integer greater than 1;
   a comparator responsive to the contents of said register and said second counter for providing a pulse each time the counts in the second counter and the register are equal, and
   output means for providing an output sequence of output pulses which include an output pulse for each input pulse and a pulse corresponding to each pulse provided by said comparator, said output means including means for providing a single output pulse when an input pulse and a pulse from said comparator are supplied thereto in time coincident.

8. The arrangement as recited in claim 7 wherein said output means include means for including in said output sequence the first $X-1$ pulses provided by said comparator during a measured time period between successive input pulses and for inhibiting the $X^{th}$ pulse from being included in said output sequence.

9. The arrangement as recited in claim 7 wherein the time periods between adjacent pairs of input pulses are not equal and said output means include means for including in said output sequence the first $X-1$ pulses provided by said comparator during a measured time period between successive input pulses and for inhibiting the $X^{th}$ pulse from being included in said output sequence.

10. The arrangement as recited in claim 9 wherein $X=2^n$ wherein $n$ is an integer.

* * * * *